United States Patent [19]

Jeranson

[11] Patent Number: 5,431,614
[45] Date of Patent: Jul. 11, 1995

[54] EXERCISE DEVICE AND AUXILIARY POWER UNIT FOR USE WITH BICYCLE

[76] Inventor: Richard C. Jeranson, 7714 Beech St. NE., Fridley, Minn. 55432

[21] Appl. No.: 78,135

[22] Filed: Jun. 14, 1993

[51] Int. Cl.6 .......................... A63B 21/00; B62M 1/14
[52] U.S. Cl. ........................................ 482/57; 482/62; 280/234; 280/233
[58] Field of Search ................ 482/57, 904, 62; 224/33 A, 36, 39, 41; 280/233, 234

[56] References Cited

U.S. PATENT DOCUMENTS

| | | | |
|---|---|---|---|
| 3,701,543 | 10/1972 | Clark et al. | 280/240 |
| 3,800,898 | 4/1974 | Griffin | 180/31 |
| 3,848,891 | 11/1974 | Vittori | 280/211 |
| 4,037,854 | 7/1977 | Large | 280/217 |
| 4,147,370 | 4/1979 | Lindsey, Jr. | 280/234 |
| 4,152,005 | 5/1979 | Vanore | 280/234 |
| 4,189,166 | 2/1980 | Lindsey | 280/234 |
| 4,469,343 | 9/1984 | Weatherford | 280/261 |
| 4,479,660 | 10/1984 | Pattison | 280/261 |
| 4,548,420 | 10/1985 | Patroni | 280/224 |
| 4,616,840 | 10/1986 | Green | 280/234 |
| 4,705,269 | 11/1987 | De Boer et al. | 482/62 |
| 4,773,662 | 9/1988 | Phillips | 280/234 |
| 4,798,395 | 1/1989 | Shaffer et al. | 482/62 |
| 4,799,668 | 1/1989 | Jansen | 482/57 |
| 4,858,942 | 8/1989 | Rodriguez | 280/233 |
| 4,895,385 | 1/1990 | Becoat | 280/234 |
| 4,902,001 | 2/1990 | Balbo | 272/71 |
| 4,966,380 | 10/1990 | Mercat | 280/259 |
| 5,002,298 | 3/1991 | Motto | 280/233 |
| 5,004,083 | 4/1991 | Lohman | 192/5 |
| 5,004,258 | 4/1991 | Becoat | 280/259 |
| 5,016,870 | 5/1991 | Bulloch et al. | 272/73 |
| 5,035,417 | 7/1991 | Ross | 272/73 |
| 5,039,122 | 8/1991 | Deutch et al. | 280/234 |
| 5,052,705 | 10/1991 | Ringle | 280/212 |
| 5,145,479 | 9/1992 | Olschansky et al. | 482/62 |

OTHER PUBLICATIONS

Torrington Co. Roller Clutches Brochure.
Torrington Company Brochure, "Drawn Cup Roller Clutches".
Richard C. Jeranson, Aerobike, product brochure, Jun. 12, 1992.

*Primary Examiner*—Stephen R. Crow
*Attorney, Agent, or Firm*—Janet Peyton Schafer

[57] ABSTRACT

An exercise device for mounting on a conventional bicycle provides upper body exercise, the device having an auxiliary handlebar that rotates about a shaft on which is mounted a auxiliary power unit. Movement of the auxiliary handlebar in a rotational motion against resistive force provides exercise to the upper body of the user. The movement of the auxiliary handlebar by the user additionally provides auxiliary force by which the front wheel of the conventional bicycle can be driven in conjunction with or independently of the rear wheel drive mechanism.

15 Claims, 5 Drawing Sheets

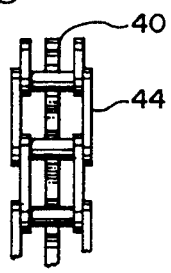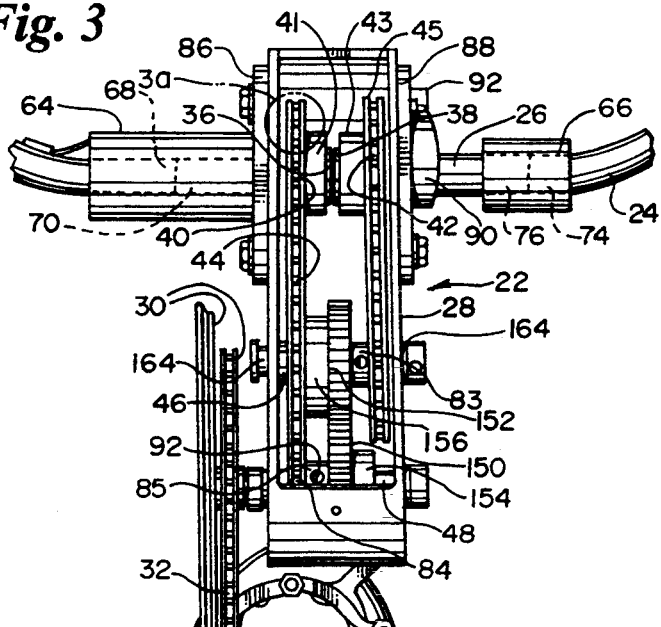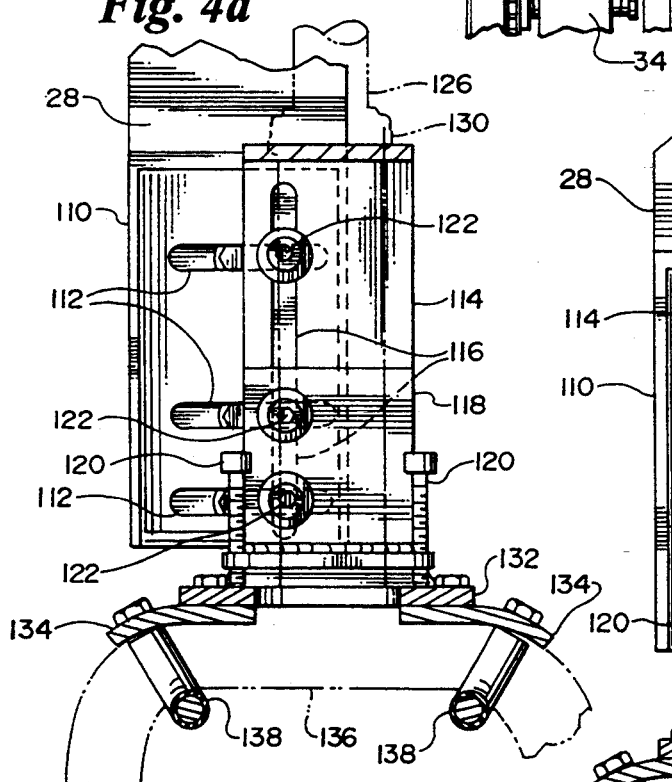

EXERCISE DEVICE AND AUXILIARY POWER UNIT FOR USE WITH BICYCLE

BACKGROUND

Conventional bicycles and stationary bicycles, ergonometers and the like, provide exercise only to the lower portion of the user's body.

Conventional rowing machines provide exercise only to the upper portion of the user's body.

A need is seen to provide apparatus, preferably one that can be added to conventional exercise equipment, that provides exercise to both the upper and lower portions of the user's body.

In a conventional bicycle, there is a steerable front wheel which, by way of a chain and sprocket system, is a follower to a pedal driven rear wheel powered by the user's lower body. This system requires the user, in conventional use, to overcome the load of the bicycle plus rider with the rear driven wheel. This has resulted in a power deficiency problem, especially when the conventional bicycle is driven up an incline. Solutions to this problem have included reducing the weight of the bicycle frame, adding a wider range of gear ratios, and providing front wheel driven bicycles.

Motion of the upper body produces energy. A system that could utilize the energy produced by the motion of the upper body, would provide auxiliary power to propel a conventional bicycle.

For the foregoing reasons, there is a need for an exercise device that can be attached to a conventional bicycle that provides upper body exercise, in addition to the lower body exercise found with a conventional bicycle, to the user and at the same time provides auxiliary power to the conventional bicycle.

SUMMARY

An exercise device for providing exercise to both the upper and lower body of the user, the device comprising a conventional bicycle, auxiliary power means and means for attaching the auxiliary power means to the conventional bicycle.

An exercise device wherein the auxiliary power means further comprises an auxiliary handlebar, a shaft on which is mounted the auxiliary handlebar, means for rotating the auxiliary handlebar about the shaft, a housing, interconnected to the auxiliary handlebar, for housing the auxiliary power means, at least one roller clutch mounted to the auxiliary handlebar and housed by the housing, at least one gear, housed by the housing, for transferring power produced by rotational movement of the handlebar, a drive shaft mounted for rotation, an internal drive chain interconnecting the at least one gear and the drive shaft, a drive sprocket reciprocally turned by rotation of the drive shaft, an external drive chain driven by the drive sprocket in rotational movement, a nest of drive gears, one of which is selected for rotational movement of the external drive chain, and a drive wheel interconnected to a nest of drive gears mounted for rotational movement on the drive wheel.

An exercise device having an auxiliary power unit wherein the means for attaching the auxiliary power means to the conventional bicycle further comprise an adjustment bracket, having at least one slot retained therein for adjustably receiving a fastener, a stationary bracket, having at least one slot retained therein for adjustably receiving a fastener, an adjustable plate on which the adjustment bracket and the stationary bracket are fixedly mounted, and fastening means for assembling the adjustment bracket, stationary bracket and adjustable plate for adjustably mounting the auxiliary power means to the conventional bicycle.

An exercise device and auxiliary power unit wherein the roller clutch provides means for driving a shaft in one direction and allows free overrun in the opposite direction.

An exercise device and auxiliary power unit wherein the at least one roller clutch has an external gear mounted thereon for being driven by the drive shaft.

An exercise device and auxiliary power unit wherein the at least one clutch provides means for continuous movement of the drive shaft in response to rotational movement of the auxiliary handlebar.

An exercise device and auxiliary power unit wherein the at least one roller clutch further comprise a pair of roller clutches, the first roller clutch locks on a shaft when the shaft is moved in a first direction while the second roller clutch slips on the shaft, and when the shaft moves in a second direction, the second roller clutch catches the shaft while the first clutch slips the shaft providing continuous one-direction movement of the drive shaft in response to the rotational movement of the auxiliary handlebars.

An exercise device and auxiliary power unit wherein the pair of roller clutches provides free-wheeling motion to the front wheel of the conventional bicycle allowing user to move the auxiliary handlebars at will, independently of the rear wheel driving means.

An exercise device and auxiliary power unit further comprising at least one bicycle stand for stationary use of the conventional bicycle with the auxiliary power means exercising both the upper and lower body of the user.

An exercise device and auxiliary power unit further comprising a pair of swivel knobs, the knob mounted on the distal end of each of the pair of auxiliary handlebars.

An exercise device and auxiliary power unit further comprising a lock for securing the auxiliary handlebar in a fixed position when mounted on a conventional bicycle.

An exercise device and auxiliary power unit further comprising means for selecting one of the nest of sprocket wheels for driving the front wheel of the conventional bicycle.

An additional object of the present invention is to provide an inexpensive upper body exercise device providing auxiliary power to a conventional bicycle.

These and other objects and advantages of the present invention will become apparent with reference to the drawings, the description of the preferred embodiment and the appended claims.

BRIEF DESCRIPTION OF THE DRAWINGS

FIG. 3 is a front elevational view thereof with the power unit cover removed;

FIG. 3a is a enlargement view thereof taken from FIG. 3 showing the sprocket driven continuous chain;

FIG. 4a is a sectional view thereof taken along line 4—4 in FIG. 6 illustrating the mounting of the assembly of the power unit to the conventional bicycle frame;

FIG. 4b is a sectional view thereof taken along line 4—4 in FIG. 6, demonstrating the adjustment slots usage to increase tension on external sprocket chain;

DETAILED DESCRIPTION OF THE PREFERRED EMBODIMENTS

Definitions

A roller clutch is a clutch that transfers torque between a shaft and a housing in one direction and allows free overrun in the opposite direction.

Free-wheeling in a power transfer system is use of a clutch to allow a shaft to run free from a moving sprocket.

OVERVIEW

The present invention is directed to an apparatus that satisfies this need for an exercise device that can be attached to a conventional bicycle that provides upper body exercise, in addition to the lower body exercise found with a conventional bicycle, and at the same time provides auxiliary power to the conventional bicycle.

Figure 1:
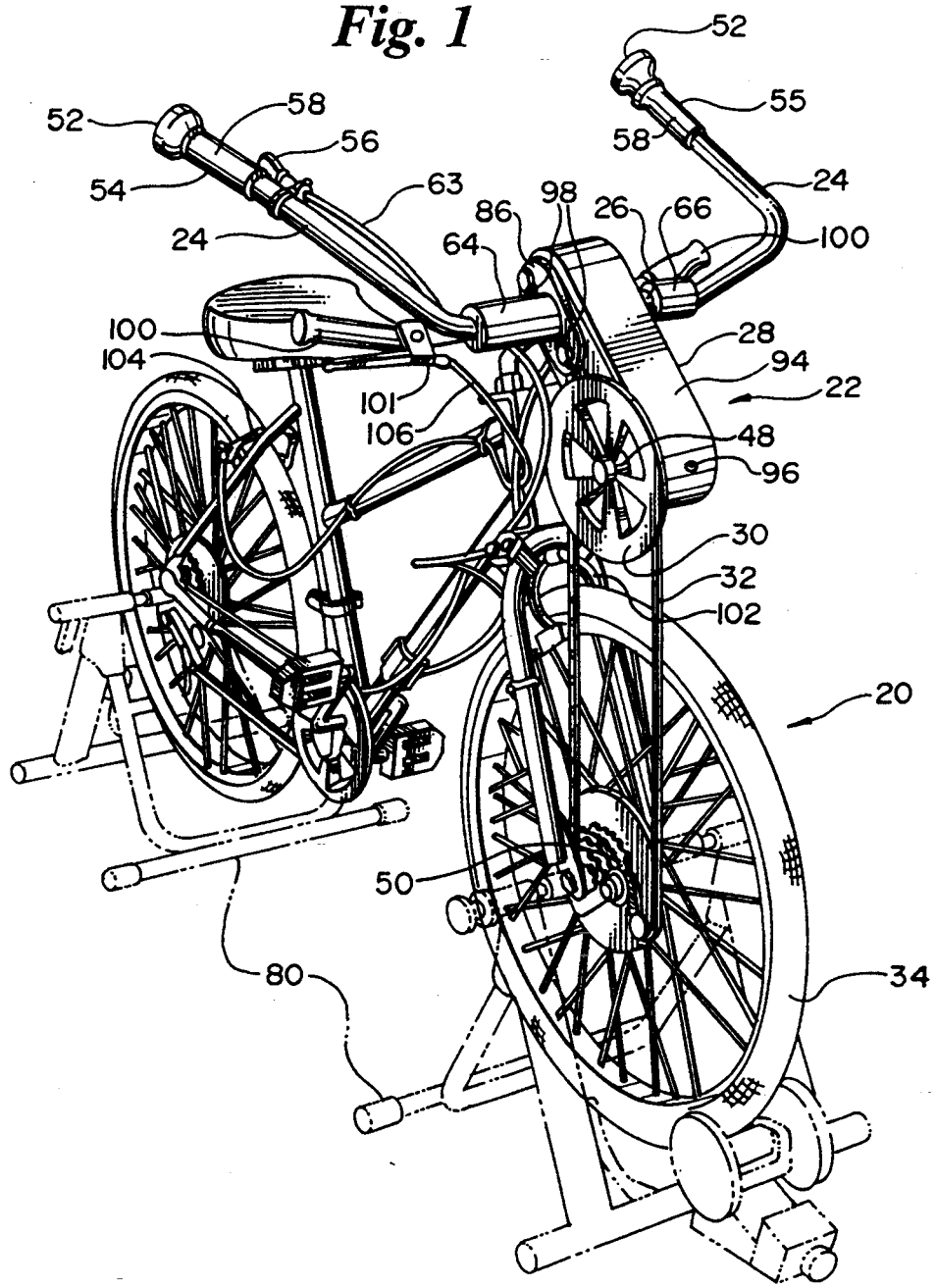
FIG. 1 is a perspective view of the invention within its environment.

The apparatus comprises, as shown in FIG. 1, a conventional bicycle 20 shown adapted with an auxiliary power unit shown generally at 22. The auxiliary power unit 22 comprises an auxiliary handlebar 24 coupled to a first shaft 26 on which is mounted for use an auxiliary power unit housing 28, the internal working of which drives an external drive sprocket 30 and external drive chain 32 which in turn drives the front wheel 34 of the conventional bicycle 20.

Figure 2:
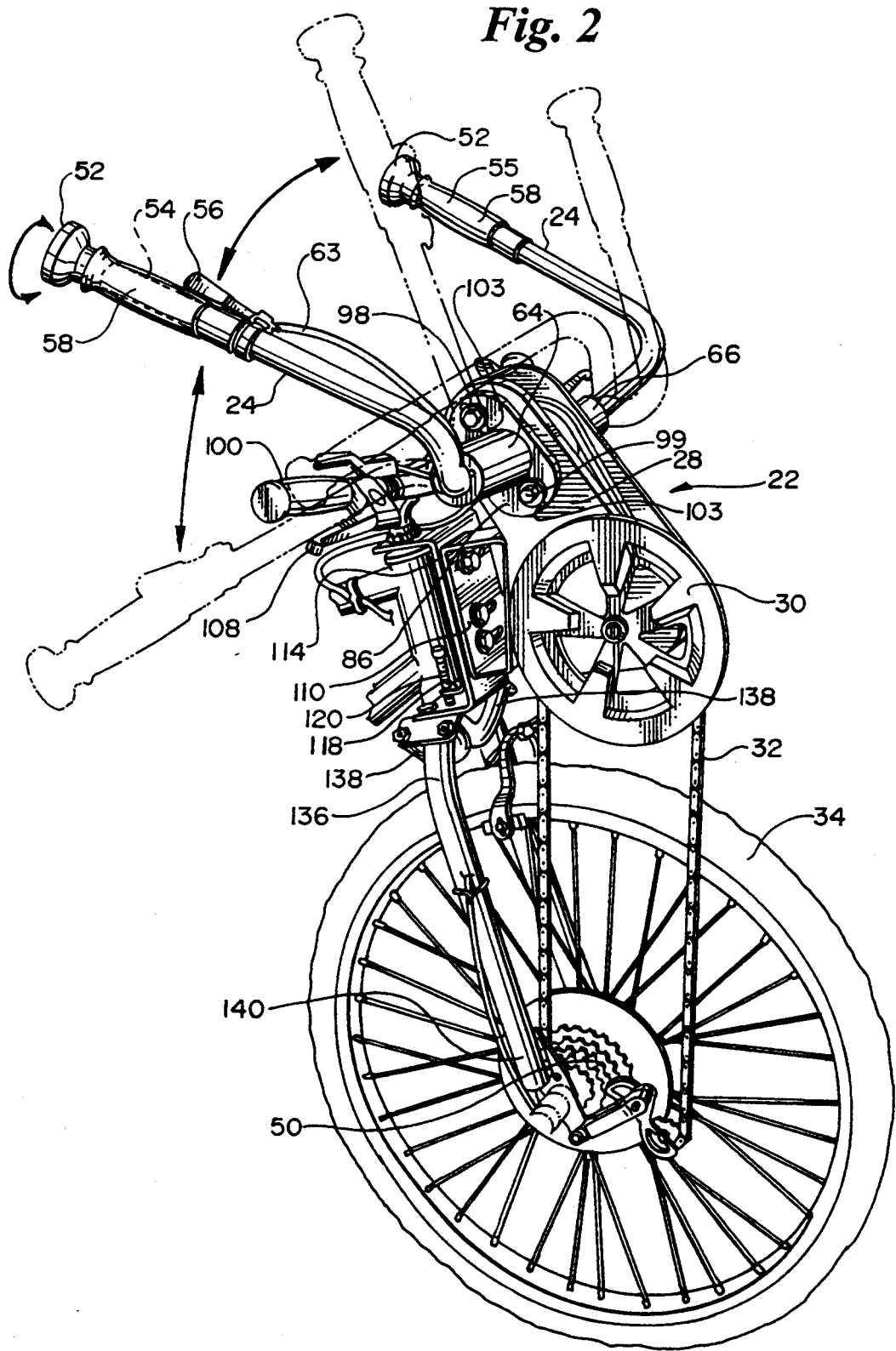
FIG. 2 is a fragmentary perspective view thereof showing the auxiliary power unit and the rotational motion of the auxiliary handlebar.

The auxiliary handlebar 24 is mounted for rotational movement about the first shaft 26. This rotational motion is illustrated at FIG. 2. The auxiliary handlebar 24, as it is rotated, is moved against resistance of the front wheel 34 to being moved, providing exercise to the operator. The motion of the auxiliary handlebar 24 can be to either push down in a pumping action from approximately waist level of the operator to a position approximately hip level or lower; or the auxiliary handlebar 24 can be pulled up in a rowing action from a position approaching or past vertical to a position near the body of the operator, all in front of the operator. The auxiliary handlebar 24 of this embodiment of the invention may be rotated 360 degrees about the first shaft 26. In actual use conditions, it has been found that it is not necessary to move the auxiliary handlebar 24 360 degrees, but any amount of movement has been found to be beneficial for both exercise purposes and for production of auxiliary power. In actual use conditions, comfort of the individual operator can be accommodated by the embodiment of this invention and the individual operator controls the range of movement of the auxiliary handlebar 24.

The auxiliary power unit 22, shown in detail at FIG. 3, has a first 36 and second roller clutch 38 to which are press-fit a pair of sprockets, the hub of each of these sprocket shown, first socket hub 41 and second sprocket hub 43, that in turn cause a continuous chain to drive either a second shaft 46 or third shaft 48. The pair of roller clutches 36,38 are mounted for use onto the first shaft 26. This pair of roller clutches 36,38 are mounted facing each other and are mounted opposite of each other, allowing movement of the first shaft 26 to cause the first roller clutch 36 to grab, or lock, on the first shaft 26 and turn the there-associated first sprocket while the second sprocket on the second roller clutch 38 free-wheels. Movement of the first shaft 26 in a second direction causes the second roller clutch 38 to grab or lock onto the first shaft 26 and turn its associated second sprocket 42 while the first roller clutch 36 free-wheels. This grabbing allows the rotational movement of the auxiliary handlebar 24 about its axis to produce power which is transferred, through a series of sprocket-carrying shafts, to an ultimate drive, the third shaft 48, which turns the external drive sprocket 30 which in turn by means of an external drive chain 32 drives the front wheel 34 of the conventional bicycle 20. Any movement of the auxiliary handlebar 24 results in driving force being transferred as forward motion to the front wheel 34 of the conventional bicycle 20.

Also envisioned is use of a single roller clutch in the auxiliary power unit. Use of a single roller clutch will result in driving force being applied to the front wheel by one direction movement of the auxiliary handlebar. Movement in a second direction, "backswing", would not result in power being delivered to the front wheel but would free-wheel.

DETAILED DESCRIPTION OF THE ELEMENTS

As shown in FIG. 1 the auxiliary handlebar 24, on which are mounted a pair of swivel knobs, 52, one each at a first end 54 and a second end 55. The auxiliary handlebar 24, has mounted thereon a locking lever 56 for locking the auxiliary handlebar 24 in one of a range of positions. The swivel knobs 52 allow the operator to grip the ends of the auxiliary handlebar 24 in moving the auxiliary handlebar 24 about the first shaft 26. Additionally, conventional handgrips 58 can be used for moving the auxiliary handlebar 24 in a rotational movement about the first shaft as illustrated in phantom at FIG. 2. During the motion of the auxiliary handlebar 24, both the first end 54 and second end 55 of the auxiliary handlebar 24 move in tandem about a first shaft 26, producing the power which ultimately drives the front wheel 34 of the conventional bicycle 20.

The auxiliary handlebar 24 is mounted to the first shaft 26 by means of a first coupling 64 and second coupling 66. The first coupling 64 attaches a third end 68 of the auxiliary handlebar 24 to a first end 70 of the first shaft 26, shown in phantom in FIG. 3 the first coupling 64 being attached to, and therefore coupling together, the third end 68 of the auxiliary handlebar 24 and the first end 70 of the first shaft 24 by at least a pair of set screws, not shown. The second coupling 66 attaches, using at least a pair of set screws, not shown, a fourth end 74 of the auxiliary handlebar 24 to a second end 76 of the first shaft 26, also shown in phantom at FIG. 3.

A first adjustment plate 86, and a second adjustment plate 88, one on each exterior side of the auxiliary power unit housing 28, position the power unit housing 28 onto the first shaft 26. A collar 90, keeps the first shaft 26 shown at FIG. 3, from moving horizontally within the auxiliary power unit housing 28. This collar 90 is attached to the first shaft 26 by means of a set screw 92. Also retained in the first coupling 64 is a spring 61 activated locking pin 60 connected by cable 63 to the locking lever 56. Engagement of the locking pin 60, shown engaged in FIG. 9a, the locking pin 60 entering and being held by one of a series of apertures 62, shown in phantom in FIG. 8, formed in the first adjustment plate 86, locks the auxiliary handlebar 24 in position preventing further rotational movement by the auxiliary handlebar 24 until the locking pin 60 is pulled from the aperture 62, as shown in FIG. 9b, by means of pressure on the locking cable 63 applied by manually moving the locking lever 56.

Shown in FIG. 1 is the auxiliary power unit 22 which is mounted for use onto the first shaft 26. Mounted onto the exterior of the auxiliary power unit housing 28 is an external drive sprocket 30, driven by a third shaft 48 that in turn drives an external drive chain 32 that is interconnected to one of a cluster of second external drive sprockets 50 mounted for use on the front wheel 34 of the conventional bicycle 20.

Also shown in FIG. 1 in phantom are a pair of free stands 80 allowing use of a version of this invention indoors. Also shown here is the standard handlebar 100 with at least one hand brake 101 mounted thereon. A conventional front caliper brake 102 and rear caliper brake 104 are shown with their associated cables 106 attached.

The auxiliary power unit 22 is shown at FIG. 1 with the cover 94 in place. A fastener 96 holds the cover 94 in place.

FIG. 2 illustrates movement of the auxiliary handlebar 24 about the first shaft 26. The auxiliary handlebar 24 can be positioned in any position 360 degrees about the first shaft 26; two positions of which are shown here in phantom. Only the individual limitations of the individual operator limits the range of motion of the auxiliary handlebar 24.

Figure 7:
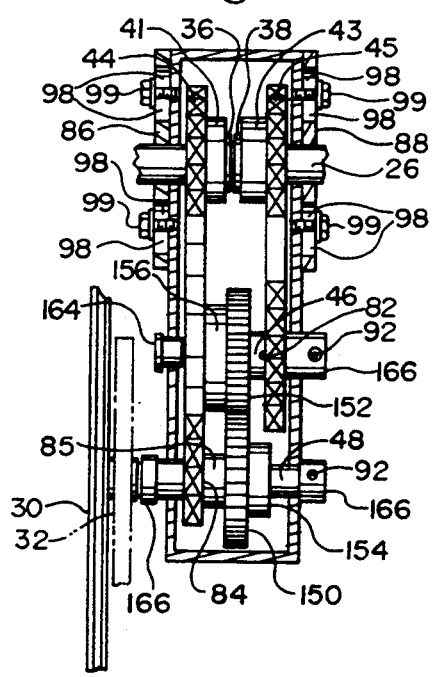
FIG. 7 is a sectional view thereof taken along line 7—7 in FIG. 6 showing the internal layout of the power unit.

In FIG. 2 the first adjustment plate 86 is shown with a pair of slots 98 formed therein. A pair of bolts 99, each with a washer 103, fastened through the slots 98, fasten the first adjustment plate 86 to the auxiliary power unit housing 28. The slots 98 allow adjustment of the housing 28 on the first shaft 26. The adjustment aids in adjusting the chain length of internal continuous chains 44, 45 retained within the auxiliary power unit housing 28 as shown in FIGS. 3 and 7.

Figure 5:
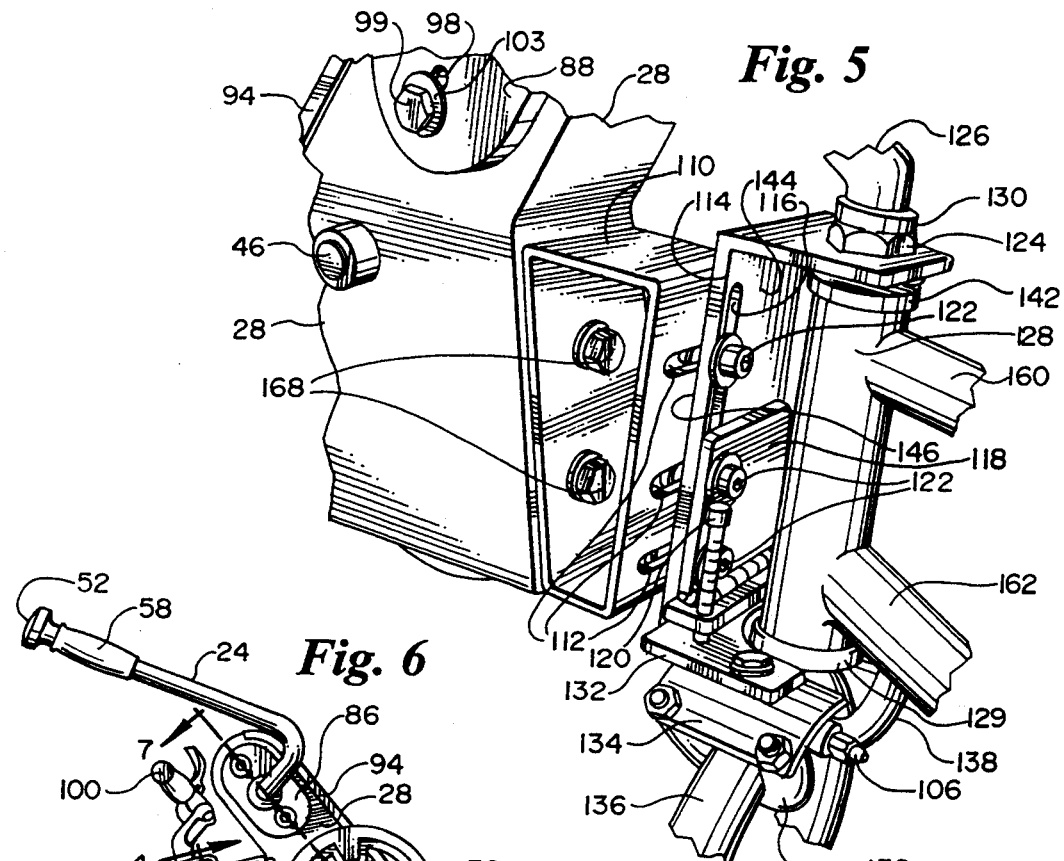
FIG. 5 is a fragmentary perspective view thereof showing the power unit adjustment slots.
Figure 6:
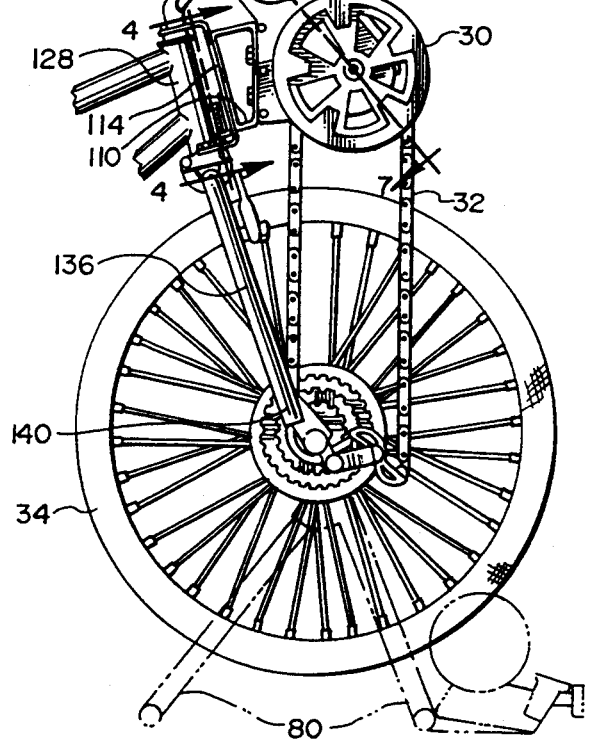
FIG. 6 is a fragmentary left side elevational view thereof with power unit assembled.

The auxiliary power unit 22 is mounted for use onto the conventional bicycle 20 by means of an adjustment bracket 110, which is fastened to the auxiliary power unit housing 28 as shown in FIG. 5. Fasteners, the preferred embodiment being hex head screws 168, with adjacent washers, attach the auxiliary power unit 22 to the adjustment bracket 110, stationary bracket 114 and adjustable plate 118. The adjustment bracket 110 has slots 112 formed therein for adjustable attachment to a stationary bracket 114. The stationary bracket 114 also has slots 116 formed therein, for adjustable attachment to the adjustment bracket 110. These slots 112, 116 are arranged to allow both vertical and horizontal adjustment of the attached auxiliary power unit housing 28 to the conventional bicycle 20. An L-shaped adjustable plate 118, with round bolt holes formed therein for attachment to the stationary bracket, and a pair of adjustment screws 120 held thereby, aids in adjusting the attachment of the auxiliary power housing 28 to the conventional bicycle 20. In the preferred embodiment, socket head screws 122 are used to combine the assembly of the adjustment bracket 110, the stationary bracket 114 and adjustable plate 118 for use to enable attachment of the auxiliary power unit 22 assembly to the conventional bicycle 20. The adjustment provided by and inherent to, by means of the horizontal and vertical slots 112, 116 therein, shown at FIGS. 4a and 4b, the adjustment bracket 110, stationary bracket 114 in conjunction with the adjustable plate 118 allow the auxiliary power unit 22 to be mounted on a wide variety of conventional bicycles 20.

A first end 124 of the stationary bracket 114, shown at FIG. 5 has an aperture formed therein, not shown, for mounting the stationary bracket 114 onto the stem 126 of the conventional bicycle 20. In actual use conditions, the standard handlebar 100 is removed leaving the stem 126, surrounded by the head tube 128 of the conventional bicycle 20, protruding from the head tube 128 and around which is mounted the stationary bracket 114. A nut 130 is positioned on the first end 124 of the stationary bracket 114 holding the first end 124 of the stationary bracket 114 fast between the stem 126 and head tube 128.

The second end 132 of the stationary bracket 114 is U shaped and fits around the distal end 129 of the head tube 128. The second end 132 of the stationary bracket 114 is fastened to a clamping plate 134 having a modified U-shape, not shown, to fit around the head tube, with angled edges to conform to the shape of the top of the front fork 136. The clamping plate 134 is mounted to the front fork 136 of the conventional bicycle 20 by means of a pair of U-clamps 138 shown in detail in FIGS. 4a and 4b.

The adjustment screws 120 mounted for use on the adjustable plate 118 adjusts the auxiliary power unit 22 in a generally vertical axis to adjust the external chain 32 driven by the external drive sprocket 30. The external drive sprocket 30 is driven in response to the rotational motion of the auxiliary handlebar 20 by means of the internal drive chain and gear system. Driving the external drive sprocket 30 drives its attached external drive chain 32 which in turn drives the front wheel 34 of the conventional bicycle 20 thus powering the front wheel 34.

Also indicated in FIG. 2 is the locking lever 56, the brake lever 108 and front caliper brake 102 with the there associated brake cable 106, the locking lever described previously and shown in detail at FIGS. 9a and 9b.

FIG. 3 shows the auxiliary power unit 22, with the cover removed, showing a first roller clutch 36 and a second roller clutch 38. The first roller clutch 36 and second roller clutch 38 are mounted on a first shaft 26. The first roller clutch 36 and second roller clutch 38 are mounted opposite in operation. When the auxiliary handlebar 24 is on the upswing, the first roller clutch 36 locks onto and is turned by the first shaft 26 and the first roller clutch 36 is turned by the first shaft 26. The second roller clutch 38 freewheels, allowing overrunning of the first shaft 26 in the second roller clutch 38 by disengaging the attached sprocket wheel from the first shaft 26, during this upswing motion by the auxiliary handlebar 24. When the auxiliary handlebar 24 is on the downswing, the second roller clutch 38 locks on the first shaft 26 and is turned by the first shaft 26 while the first roller clutch 36 freewheels, allowing overrunning of the first clutch allowing disengagement of the attached sprocket from the first shaft 26. Press-fitted onto the first roller clutch 36 is a first sprocket 40, shown in detail in FIG. 3a. The first sprocket 40 is turned as a result of the first shaft 26 turning the first roller clutch 36. The attached first chain 44 is then turned and transfers the turning motion through a sprocket mounted on the third shaft 48 which turns the external drive sprocket 30 in response thereto which then turns an external drive chain 32 that turns the front drive sprocket 50, mounted for use on the front wheel 34 of the conventional bicycle 20. The rotation of the front drive sprocket 50 drives the front wheel 34 forward.

A first gear 150 mounted on the third shaft 48 turns with the third shaft 48. Because it intermeshes with the second gear 45 on the second shaft 46, the first gear 150 turns the second gear 152 which turns the second shaft 46. The motion travels back up the sequence to turn the second internal chain 45, the sprocket and the attached second shaft 46.

When the second roller clutch 38 is turned by the first shaft 26, the second roller clutch 38 transfers this motion, by way of the second sprocket 42 turning its associated second internal chain 45 transferring the motion to a second shaft 46, by moving the sprocket mounted thereon to turn a second gear 152 that intermeshes with the first gear 150 mounted on the third shaft 48. When the sprocket on the second shaft 46 is turned in response to the turning of the second internal chain 45, it drives the second gear 152 mounted thereon. The second gear 152 turns with the second shaft 26. This turns the intermeshed first gear 150 mounted on the third shaft 48, which turns the third shaft 48 turning the external drive sprocket 30, turning the external drive chain 32, turning the second external drive sprocket 50 turning the front wheel 34 of the conventional bicycle 20 for forward motion. The interaction of the first gear 150 and second gear 152 allows what would be reverse action of the chain driven second shaft 46 to be converted to forward driving of the third shaft 48 which results in the forward driving of the front wheel 34 of the conventional bicycle 20. The result being both upswing movement of the auxiliary handlebar 24 and the downswing movement of the auxiliary handlebar 24 result in forward driving of the front wheel 34 of the conventional bicycle 20.

Shown in FIG. 3 is the fourth sprocket hub 85 fixed to the third shaft 48 attached by means of a set screw 92. The third sprocket hub 83 is fixed to the second shaft 46, also by means of a set screw. The second gear 152 is fixed to the second shaft, also by means of a set screw. The fourth sprocket 84 is fixed to the third shaft 48 by means of set screw. A collar 90 is mounted on the first shaft 26 by means of a set screw 92. The collar 90 prevents the first shaft 26 from moving horizontally through the auxiliary power unit housing 28. The collar 90 prevents the sideways thrust of the roller clutch 36, 38 movement from moving the first shaft 26 sideways or horizontally within the auxiliary power unit housing 28.

The first external drive sprocket 30 is mounted on the third shaft 48 by means of a hub, again mounted by set screw 92. A shaft collar is mounted on the third shaft 48 and another shaft collar is mounted on the second shaft 46 by means of set screws 92.

The first coupling 64 abuts the first adjustment plate 86, which is bolted onto the auxiliary power unit housing 28. The second coupling 66 is shown on the first shaft 26 joining the first shaft 26 to the auxiliary handlebar 24 by means of a series of set screws 92, not shown.

FIG. 3a illustrates in detail the first sprocket 40 driving the first internal drive chain 44 in response to turning of the first shaft 26 in a first direction. The other drive chains and respective sprockets turn in similar fashion.

FIG. 4a illustrates in detail the adjustment bracket 110 with a series of slots 112 for adjustable attachment to the stationary bracket 114, also having formed therein a series of slots 116. The configuration of the slots 112, 116 being in opposite directions, one vertical and one horizontal, allowing for adjustment in the mounting of the auxiliary power unit 22 to a variety of types of conventional bicycles 20. The addition of the adjustable plate 118 allows for easy adjustment of the positioning of the auxiliary power unit 22 on the conventional bicycle 20 by easily adjusting the entire unit up or down. In actual use conditions, the socket head screws 122 are loosened on the stationary bracket 114 adjustment bracket 110 connection, the adjustment screws 120 adjusted, holding the stationary bracket 114 and adjustment bracket 110 in place relative to each other. Movement of the auxiliary power unit 22 can be adjusted by rotating the adjustment screws 120, then the socket head screws 122 on the stationary bracket 114 adjustment bracket 110 connection are tightened. The adjustable plate 118 holds the stationary bracket 114 and adjustment bracket 110 in place relative to each other, the stationary bracket 114 and adjustment bracket 110 are moved as a unit by means of screwing in or out the adjustment screws 120. This allows easy adjustment of the auxiliary power unit 22 on the conventional bicycle 20 which in turn adjusts the length of the external drive chain 32. Socket head screws 122 are used here because of the tight clearance between the conventional bicycle 20 housing and the stationary bracket 114, however, other fasteners that meet these clearance requirements could also be used.

The second end 132 of the stationary bracket 114 is mounted to a clamping plate 134, by bolts in the preferred embodiment but any similar fastener could be used. The clamping plate 134 holds the assembled unit to the front fork 136 of the conventional bicycle 20 by means of U clamps. These U clamps 138, in the preferred embodiment, are encased by rubber to prevent marring of the paint on the conventional bicycle.

FIG. 4a shows the assembled stationary bracket 114, adjustment bracket 110, adjustable plate 118 in an upward adjustment direction. Motion of the adjustment screws 120 are indicated by arrows in this view. The adjustable plate 118, because it has circular holes rather than slots, not shown, acts as a platform by which both the adjustment bracket 110 and the stationary bracket 114 may be adjusted in an easy manner.

FIG. 5 shows the adjustment bracket 110 as a spacer between the auxiliary power unit housing 28 and the conventional bicycle 20. Clearance between the auxiliary power unit housing 28 and the conventional bicycle 20 is required for ease in turning the adapted bicycle. In actual use conditions, the addition of the auxiliary power unit 22 has no effect on the steering capabilities of the conventional bicycle 20 to which it is mounted. The bicycle is easy to maneuver in its adapted form. Shown in this figure is a top tube 160 and a down tube 162 of a conventional bicycle 20, however, it is believed that any configuration of tubing on a conventional bicycle 20 could be used and adapted to by the foregoing embodiment of this invention to adapt the bicycle by adding the auxiliary power unit 22.

FIG. 7 shows in detail the first roller clutch 36 and second roller clutch 38 mounted on the first shaft 26, the first adjustment plate 86 and second adjustment plate 88 also are mounted on the first shaft 26, the second shaft 46 on which is fixedly mounted a third sprocket 82 and a second gear 152. The first internal chain 44, driven by the first roller clutch 36, does not come into contact with the second gear 152 or second gear hub 156. The first internal chain 44 only comes into contact with the fourth sprocket 84 fixed to the third shaft 48.

The slots 98 on the adjustment plates 86,88 allow for adjustment of the internal chains 44,45 and first shaft 26 the entire auxiliary power unit housing 28 to be positioned in the optimum position for the external drive chain 32.

Figure 8:
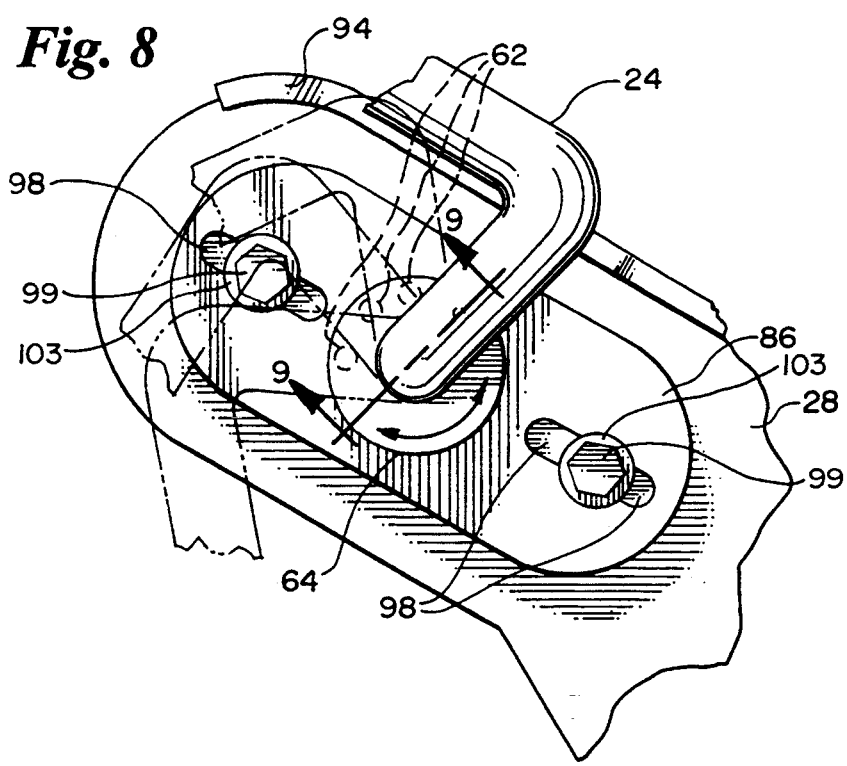
FIG. 8 is an enlarged fragmentary view thereof demonstrating the rotation motion of the auxiliary handlebars and the adjustment slot for the adjustment of tension on the internal sprocket chains.

Motion of the auxiliary handlebar 24 is also shown in phantom in FIG. 8. Also shown in phantom are the series of apertures 62 formed in the first adjustment plate 86 as seen through the first coupling 64. Again, the adjustment plate slots 98 and positioning of the bolt 99 or other attachment device are illustrated at FIG. 8.

Figure 9A:
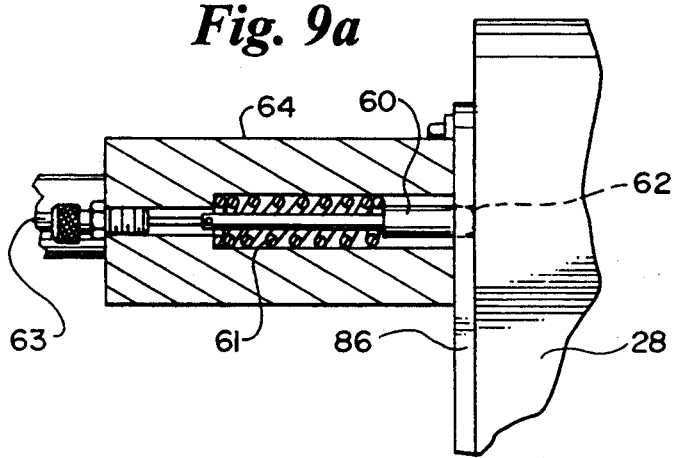
FIG. 9a is a sectional view thereof taken along line 9—9 in FIG. 8 illustrating locking mechanism of handlebars; and, FIG. 9b is a sectional view thereof taken along line 9—9 in FIG. 8 illustrating the spring action of the locking mechanism.
Figure 9B:
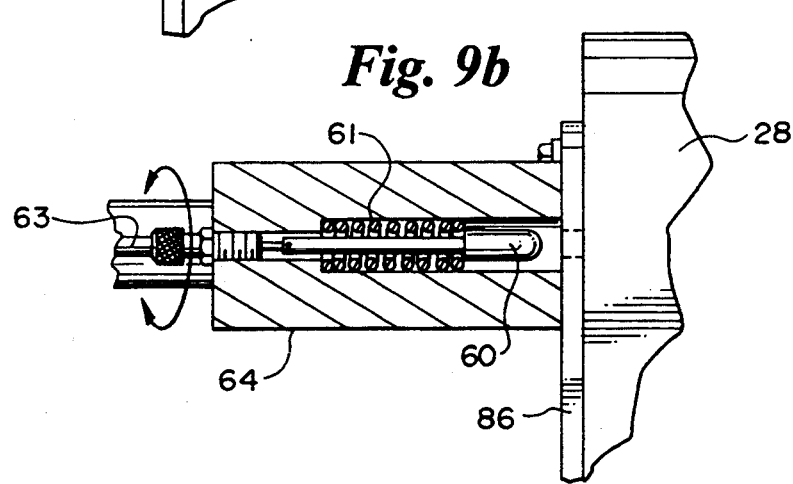

FIG. 9a illustrates the auxiliary handlebar locking mechanism showing a locking pin 60 in the locked position. The locking pin 60 is contained in the housing of the first coupling 64. The locking pin 60 is attached by cable 63 to the locking lever 56, mounted for use on the auxiliary handlebar 24, although it could also be mounted on the standard handlebar 100. The locking pin 60 is spring 61 driven. When the locking cable 63 is released from tension by manually moving the locking lever 56, the spring 61 pushes the locking pin 60 into an aperture 62 formed in the first adjustment plate 86. The locking pin 60 is pushed out by the spring 61. The first available aperture 62 in the series of apertures in the first adjustment plate 86 accepts the locking pin 60, holding the auxiliary handlebar 24 stationary.

FIG. 9b illustrates the locking pin 60 in the released position after tension has been applied to the locking cable 63. Tensioning the locking cable 63 pulls the locking pin 60 against the locking spring 61, pulling the locking pin 60 out of the aperture 62 of the first adjustment plate 86. The first coupling 64, in addition to joining the auxiliary handlebar 24 and the first shaft 26 and carrying the locking pin 60, performs additionally the function of the collar 90 on the other side of the auxiliary power unit housing 28, namely, to keep the first shaft 26 in position in the auxiliary power unit housing 28.

METHOD FOR USING

In actual use conditions an extra long handlebar is used as the auxiliary handlebar 24. One of the first steps in fitting this auxiliary power unit 22 and exercise device to the conventional bicycle 20 is to spread the distal end 140 front fork 136 of the conventional bicycle 20, as shown at FIG. 2. In use, the standard handlebar 100 of the conventional bicycle 20 is removed and the stationary bracket 114, the aperture formed in the first end 124 of the stationary bracket 114 is dropped down over the stem 126 extending from the proximal end 142 of the head tube 128 of the conventional bicycle 20. A nut 130, normally found on the head tube 128 of a conventional bicycle 20, is screwed down to fasten the first end 124 of the stationary bracket 114 to the conventional bicycle 20. The first end 124 of the stationary bracket 114 is tensioned between a proximal end 142 of the head tube 128 and the nut 130.

The adjustment bracket 110 is then loosely fitted to the stationary bracket 114 with the adjustable plate 118 being positioned on a proximal side 144 of the stationary bracket 114 at the same time the adjustment bracket 110 is positioned on the distal side 146 of the stationary bracket 114. A clamping plate 134 is then bolted to the second end 132 of the stationary bracket 114. The clamping plate 132 is then mounted to the front fork 136 of the conventional bicycle 20 by a pair of U clamps 138 as a means of securing the auxiliary power unit 22 to the conventional bicycle 20.

The auxiliary power unit housing 28 is then bolted, or otherwise fastened, to the adjustment bracket 110. In the preferred embodiment, threaded apertures, not shown, are formed in the wall of the auxiliary power unit housing 28. This eliminates the need for nuts to hold the bolts 168 secure. Other means of fastening the auxiliary power unit housing 28 are also envisioned.

The assembly of the auxiliary power unit 22 is as follows: Sleeve bearings 164 are press fit into the holes in the auxiliary power unit housing corresponding with the position of the second shaft 46 and third shaft 48. The second 46 and third shaft 48 are individually pushed through the sleeve bearing 164 mounted holes. The second shaft 46 is pushed through the hole in the housing 28 side, the second gear 152 is fixedly mounted by means of a set screw thereon and second shaft 26 is pushed in further. The third sprocket 82 is positioned on the second shaft, by means of a set screw used to secure the third sprocket hub 83 thereto. This holds the second gear 152 in position. The second shaft is then pushed through the wall of the housing 28, through the flanged sleeve bearing 164 surrounding that hole. A shaft collar 166 is secured to the end of the second shaft 26, attached by set screw 92. The third shaft 48 is pushed in through the flanged sleeve bearing 164 lined hole in a wall of the housing 28. A shaft collar 166 is positioned on the third shaft 48, the third shaft 48 pushed in further so the first gear 150 and fourth sprocket 84 can be fixedly mounted thereon by means of a set screw 92. The third shaft 48 is then pushed through the wall of the housing 28 through the middle of the flanged sleeve bearing 164 and the third shaft 48 extended so that an external sprocket 30 can be mounted thereon. Again, shaft collars 166 can be mounted on the shaft as positioners and to secure the shaft in position in the housing. An external drive sprocket 30 is mounted on the end of the third shaft 48.

In actual use conditions, the auxiliary handlebar 24 is severed at it's midpoint, shown in phantom at FIG. 3, and the first shaft 26, shown in detain in FIG. 3 is fitted into the first coupling 64 which abuts the first adjustment plate 86. This first coupling 64, in addition to joining the auxiliary handlebar 24 to the first shaft 26, also carries the locking pin 60. Additionally, the first coupling 64 acts in the same manner as the collar 90, namely, holding the first shaft 26 in position in the auxiliary power unit housing 28. The first shaft 26 is then pushed into the housing 28 and the first roller clutch 36, with a first sprocket 40 press-fit thereon, slides onto the first shaft 26. The second roller clutch 38, with its associated second sprocket 42 press-fitted thereon is then slid into place. The first roller clutch 36 and its associated first sprocket 40 and the second roller clutch 38 and its associated second sprocket 42 are not fixedly mounted to the first shaft 26.

The first shaft 26 is then pushed through the second wall of the housing 28, a second adjustment plate 88 is threaded onto the first shaft 26 and bolted 99 to the housing. A collar 90 is positioned on the first shaft 26 and a set screw 92 secures it to the first shaft 26. The collar 90 holds the first shaft 26 in position inside the auxiliary power unit 22. The first coupling 64 applies tension on a first side of the housing 28 with the collar 90 applying tension on a second side of the housing 28 to secure the first shaft 26 in a position that resists sideways travel when thrust is applied to the roller clutches 36,38 by means of the first shaft 26 turning within the auxiliary power unit housing 28. After the gears and sprockets are positioned on their respective shafts, the continuous chains are attached. A master link attachment of the chain allows adjustment of the individual chains to fit the length required. The internal continuous chains are adjusted more later by adjusting the adjustment plates 86,88. The external continuous chain is adjusted by repositioning the housing by means of loosening the socket head screws 122 on the adjustment bracket 110, stationary bracket 114, and adjustable plate 118 assembly. The housing is then physically pulled up to adjust the external drive chain 32.

In actual use conditions, a conventional rear wheel with a nest of drive sprockets mounted thereon is used as the front wheel. The front fork of the conventional bicycle must be opened at the distal end 148 to allow the wider wheel to be mounted thereon.

ADVANTAGES OF THE INVENTION

The previously described version of the present invention has many advantages including providing exercise to upper portion of operator's body in conjunction with the lower portion being exercised by a conventional bicycle. Additionally, an embodiment of the invention provides auxiliary power to a conventional bicycle. This is particularly helpful in going up an incline such as experienced in mountain bicycling.

An important advantage of the embodiment of this invention is that both the upswing movement of the auxiliary handlebar and the downswing movement of the auxiliary handlebar result in forward driving of the front wheel.

In these embodiments of the invention it is important to note that the auxiliary handlebar doesn't move except when pushed or pulled by the operator; the handlebar is free-wheeling. The operator can choose to use the foot pedals of the conventional bicycle alone, to use the auxiliary handlebar power unit alone or to use both means of propelling the bicycle at the same time. It is important to note that the conventional foot pedal and the auxiliary handlebar powered unit operate independently of each other, namely, the power generated by each method of propulsion is added, and has no effect on the rate of the other method of propulsion other than that the bicycle is moving faster than it would have with only one method in use.

An additional advantage of an embodiment of this invention is that the conventional bicycle with attached auxiliary power unit may be mounted on at least one free stand, as shown in FIG. 1, for indoor use. If the operator wishes to exercise both upper and lower portions of their body simultaneously, they will need two free stands for indoor use. Additionally, the integrity of the conventional bicycle is not impaired by the addition of the auxiliary power unit. No holes are drilled and by use of rubber coating on the U-clamps, the paint of the conventional bicycle is not marred by attachment of an embodiment of this invention thereto. If the operator so wishes, the auxiliary power unit can be removed and the conventional bicycle easily returned to previous condition.

An additional advantage of an embodiment of this invention is that the operator determines what range of movement the auxiliary handlebar takes. This makes this embodiment of the invention completely adaptable to anyone with any ability to move their upper body.

While the auxiliary handlebar stays in the position the operator last left it in, it is possible for the auxiliary handlebar to be locked in position by means of the spring activated locking pin. A further advantage if an embodiment of this invention is that the conventional handlebar may be removed. The auxiliary handlebar may be utilized to steer the conventional bicycle. In actual use conditions, the conventional handlebar has been retained on the conventional bicycle as a convenient place to mount the brakes and gearshift of the conventional bicycle but the brakes and gearshift could also be mounted on the auxiliary handlebar.

The wide range of adjustment in attachment of the auxiliary power unit to the conventional bicycles, provided by the adjustable bracket, stationary bracket and adjustment plate, allow a wide variety of conventional bicycles to be adapted by addition of an embodiment of this invention. This allows the "retro-fitting" of the auxiliary power unit and exercise device to conventional bicycles already in possession of the operator reducing the cost to the operator of the obtaining exercise equipment that can exercise specifically the upper body.

An additional advantage of the embodiment of this invention is use of the adjustment plate that can be used as a platform to easily adjust the adjustable bracket and or stationary bracket. The adjustment screws are the means by which this platform function of the adjustment plate are utilized.

What is claimed is:

1. An exercise device for use with a conventional bicycle for providing exercise to both the upper and lower body of the user, the device comprising:
   a) an auxiliary handlebar;
   b) a shaft on which is mounted the auxiliary handlebar;
   c) means for rotating the auxiliary handlebar about the shaft;
   d) a housing, interconnected to the auxiliary handlebar;
   e) at least one roller clutch mounted to the auxiliary handlebar and housed by the housing;
   f) a first drive shaft housed by the housing, mounted for rotation;
   g) an external drive sprocket reciprocally turned by rotation of the first drive shaft;
   h) an internal drive chain interconnecting the external drive sprocket and the first drive shaft;
   i) an external drive chain driven by the external drive sprocket in rotational movement;
   j) a nest of drive sprockets, one of which is selected for rotational movement of the external drive chain;
   k) a drive wheel interconnected to the nest of drive sprockets mounted for rotational movement on the drive wheel; and l) means for attaching the auxiliary handlebar to a conventional bicycle.

2. The device of claim 1, wherein the means for attaching the auxiliary handlebar to the conventional bicycle further comprises:
   a) an adjustment bracket, having at least one slot retained therein for adjustably receiving a fastener;
   b) a stationary bracket, having at least one slot retained therein for adjustably receiving a fastener;
   c) an adjustable plate on which the adjustment bracket and the stationary bracket are fixedly mounted;
   d) fastening means for assembling the adjustment bracket, stationary bracket and adjustable plate for adjustably mounting the auxiliary power means to the conventional bicycle; and
   e) a pair of adjustment screws, in combination with the adjustable plate, for adjusting the external chain's tension.

3. The device of claim 1, wherein the at least one roller clutch provides means for driving the drive shaft in one direction and allows free overrun in the opposite direction.

4. The device of claim 3, wherein the at least one roller clutch has a sprocket mounted thereon for driving the first drive shaft.

5. The device of claim 4, wherein the at least one clutch provides means for continuous movement of the drive shaft in response to rotational movement of the auxiliary handlebar.

6. The device of claim 5, wherein the at least one roller clutch further comprise a pair of roller clutches, the first roller clutch locks on a shaft when the shaft is moved in a first direction while the second roller clutch slips on the shaft, and when the shaft moves in a second direction, the second roller clutch catches the shaft while the first clutch slips the shaft providing continuous one-direction movement of the drive shaft in response to the rotational movement of the auxiliary handlebars.

7. The device of claim 6, wherein the pair of roller clutches provides free-wheeling motion to the front wheel of the conventional bicycle allowing user to move the auxiliary handlebars at will, independently of the rear wheel driving means.

8. The device of claim 7, further comprising at least one bicycle stand for stationary use of the conventional bicycle with the auxiliary power means exercising both the upper and lower body of the user.

9. The device of claim 8, further comprising a pair of swivel knobs, the knob mounted on each end of the auxiliary handlebar.

10. The device of claim 9, further comprising a releasably engagable lock for securing the auxiliary handlebar in a fixed position when mounted on the conventional bicycle.

11. The device of claim 1, further comprising means for selecting one sprocket from a nest of sprocket wheels for driving the front wheel of the conventional bicycle.

12. An auxiliary power device for providing auxiliary power to a conventional bicycle comprising:
   a) an auxiliary handlebar 24 mounted for rotatable motion;
   b) first shaft 26, about which the auxiliary handlebar is mounted for rotatable motion;
   c) a pair of roller clutches 36, 38, mounted for use facing each other and mounted opposite of each other on the first shaft;
   d) a pair of sprockets 40, 42, each of which is press-fit onto one each of the pair of roller clutches;
   e) a continuous chain;
   f) a series of sprocket carrying shafts, driven by the continuous chain, allowing movement of the first shaft 26 to cause the first roller clutch 36 to grab onto the first shaft 26 and turn the there-associated first sprocket 40 while the second sprocket 42 on the second roller clutch 38 free-wheels, alternatively, movement of the first shaft 26 in a second direction causes the second roller clutch 38 to grab or lock onto the first shaft 26 and turn its associated second sprocket 42 while the first roller clutch 36 free-wheels allowing the rotational movement of the auxiliary handlebar 24 about its axis, both in a first direction and a second direction, to produce power which is transferred, through the series of sprocket-carrying shafts, to the conventional bicycle.

13. The device of claim 1, further comprising means for providing resistance to movement of the auxiliary handlebar rotating about the shaft.

14. The device of claim 1, wherein the auxiliary handlebar provides means for steering the conventional bicycle.

15. The device of claim 12, wherein the means for attaching the auxiliary power means to the conventional bicycle further comprises:
   a) an adjustment bracket, having at least one slot retained therein for adjustably receiving a fastener;
   b) a stationary bracket, having at least one slot retained therein for adjustably receiving a fastener;
   c) an adjustable plate on which the adjustment bracket and the stationary bracket are fixedly mounted;
   d) fastening means for assembling the adjustment bracket, stationary bracket and adjustable plate for adjustably mounting the auxiliary power means to the conventional bicycle; and
   e) a pair of adjustment screws, in combination with the adjustable plate, for adjusting external chain tension.

* * * * *